Dec. 5, 1967 K. E. STROUD ET AL 3,356,432

HIGH DENSITY RACK EQUIPMENT

Filed April 4, 1966 2 Sheets-Sheet 1

INVENTOR
K. E. STROUD - C. F. MARIOTTE
BY
Phillip A. Weiss
ATTORNEY

HIGH DENSITY RACK EQUIPMENT

Filed April 4, 1966 2 Sheets-Sheet 2

United States Patent Office 3,356,432
Patented Dec. 5, 1967

3,356,432
HIGH DENSITY RACK EQUIPMENT

Kenneth E. Stroud and Charles F. Mariotte, Raleigh, N.C., assignors to International Telephone and Telegraph Corporation Filed Apr. 4, 1966, Ser. No. 539,916
3 Claims. (Cl. 312—223)

ABSTRACT OF THE DISCLOSURE

High density wiring rack equipment including a drawer mounted double sided terminal strip. The drawer is mounted to tip either upwardly or downwardly to facilitate making connections.

This invention relates to high density rack equipment and more particularly to the packaging of components which are not susceptible to miniaturization especially—although not exclusively—of components adapted for use in miniaturized microwave equipment.

Microwave equipment is conventionally packaged in rack mounted, drawer-type housings. These drawers are usually designed to be made in standardized depth dimensions; for example, they may be any depth of 1¾″ multiples. Therefore, the minimum depth for mounting non-miniaturized components would be 1¾″. While the depth could increase to, say 3½″, it would be uneconomical to allow the drawer to become any deeper.

Terminal strips are an example of non-miniaturizable components of the type described. These strips are used to terminate heavy-density, carrier multiplex systems. More particularly, they are used to couple the carrier terminal into the microwave transmission channels. Recently, this type of microwave equipment has been revolutionized insofar as its packaging is concerned. Among other things, an adoption of solid state components and the miniaturization of apparatus has increased compactness greatly. This, in turn, has led to a considerable increase in the number of wires and cables which must be fed into a relatively small space. The problem is compounded because it is necessary for workmen to be able to make and remove connections to the terminal strip. Therefore, the dimensions of the workman's hands and tools become a limiting factor on further miniaturization.

In addition to this general trend toward the use of miniaturized, solid-state components, the wire density problem has been multiplied by a reduction in the floor space allowed for additions to an existing exchange. With the national expansion of communications, greater demands are made for more equipment. Simultaneously, the construction areas for building expansion are limited by the general growth of communities surrounding the exchange.

The foregoing description speaks of terminal strips as an example of a component which may be reduced somewhat in size, but which is not really susceptible to complete miniaturization. The terminals in these strips must connect to wires large enough to carry the required currents, must be big enough for people to solder or wire wrap the wires thereto, and must be far enough apart to avoid inductive or capacitive coupling therebetween. However, this mention of this specific equipment should not be taken as a limitation upon the claims. Other examples could also be cited to illustrate components which may be reduced somewhat in size, but which may not truly be miniaturized, such as: fuses, lamps, jacks, and the like.

Accordingly, an object of the invention is to pack components which are not susceptible of further miniaturization into spaces which are compatible with other miniaturized components.

In keeping with an aspect of this invention, these and other objects are accomplished by means of a drawer mounted double-sided terminal strip. Connecting wire lines are coupled to the top and bottom of this terminal strip with a slack which is sufficient to permit the drawer to be slid into or out of the rack. To facilitate making upper and lower connections, the drawer is mounted to tip downward or upward, thereby exposing either the upper or the lower sides of the rack to the workman's view and working access. Other components in the non-miniaturizable class are also mounted in the drawer. For example, fuses and jacks may be mounted in the same drawer. This serves the dual purpose of placing these components near the specific ones of the lines to which they must connect and using the space which could not otherwise be used because the stiffness of the wires connected to the drawers would tend to make it difficult to move them.

The above mentioned and other features of this invention and the manner of obtaining them will become more apparent, and the invention itself will be best understood by reference to the following description of any embodiment of the invention taken in conjunction with the accompanying drawings, in which.

Figure 1:
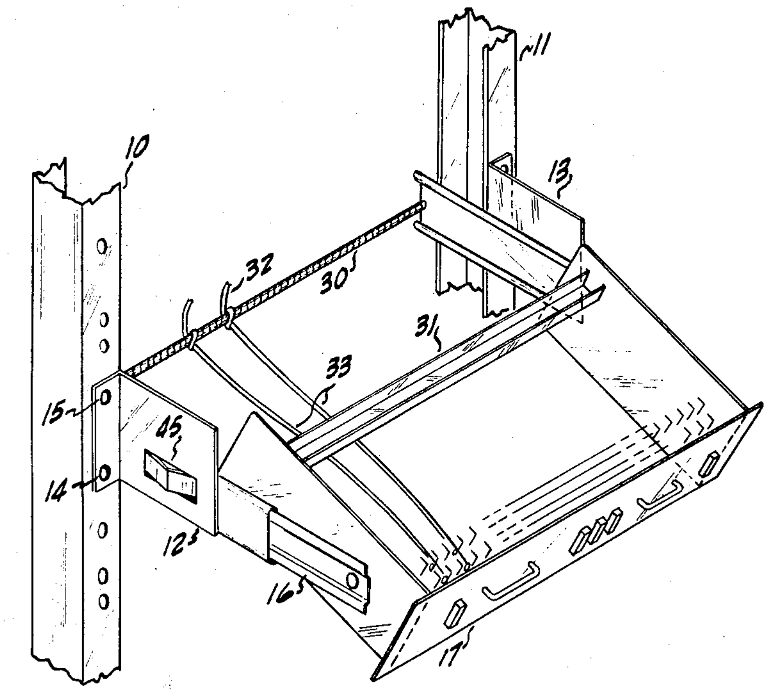
FIG. 1 is a perspective view showing a drawer mounted terminal strip with the drawer moved to an extended position.

Those familiar with rack equipment will readily recognize the usual vertical side rails 10, 11 (FIG. 1). Mounted on these side rails are a pair of supporting brackets 12, 13. The form of this mounting of bracket to side rail is not important; the drawing shows the bracket 12 as being held in place by two bolts 14, 15.

Attached to the brackets 12, 13 in horizontally opposed relationship are a pair of drawer slides, such as 16. A drawer 17 is mounted on these two slides and adapted to slide between a retracted position (as at 20, FIG. 3) and an extended position (as at 21, FIG. 3).

Figure 3:
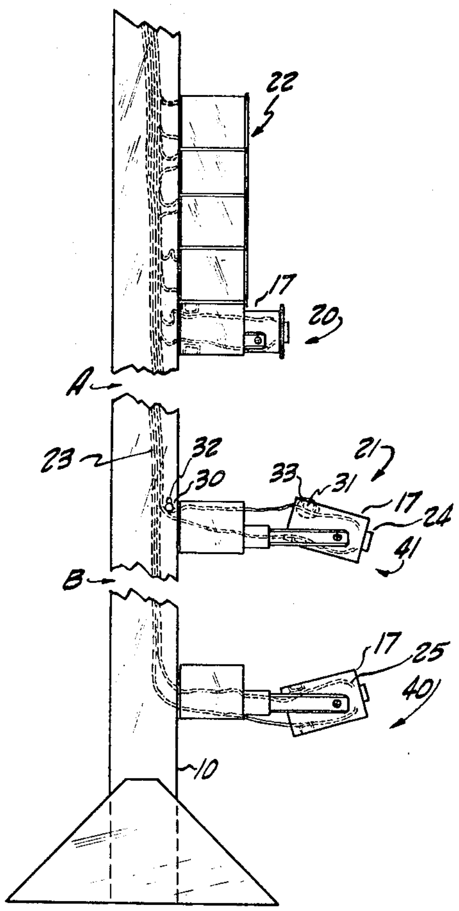
FIG. 3 is a side elevation view of a rack and terminal strip drawer in its three possible positions; and FIGS. *4a* and *4b* show a side view of an exemplary terminal strip with wire wrap and solder connections, respectively.

It should be noted that FIG. 3 shows the three drawer positions with the side rails 10, 11 broken as at A, B. This is intended to indicate that any convenient number of drawers of miniaturized microwave equipment and of terminal strips may be—but not necessarily are—mounted on a single rack. The broken side-rail lines could also indicate that each of the drawers is mounted on a different rack.

The other microwave equipment which is subject to complete miniaturization may also be mounted on the rack, as at 22 and is connected to the terminal strips in the terminal strip drawers 24, 25 by cable such as cable 23. Since all of the rack equipment is designed around a standard drawer depth module, the entire rack presents a neat appearance with all drawer panels vertically aligned when the terminal strip drawer is pushed into its retracted position.

The invention provides means for selectively interconnecting this miniaturized microwave equipment and associated external equipment. More particularly, the terminal strip (FIG. 4) is made from an insulating material 25 having conductor strips or elements extending therethrough. These strips could be either wire wrap or solder type terminals; FIG. *4a* shows the wire wrap type and FIG. *4b* shows the solder type. Incoming wires are connected to one end of these strips, and outgoing wires are connected to the other end, as at 26, 27 respectively. The terminal strips have rods such as rod 29, extending from the ends thereof for mounting the strips to the sides of the drawers or to the front and back of the drawer.

The strips are mounted in the drawer so that the actual terminal ends are in a vertical position when the drawer is in its closed position in the rack. Thus, when the drawer is pulled out and tilted upward the bottom terminals are readily accessible. In a similar manner, when the drawer is tilted downward the top terminals of the terminal strips are readily accessible. The use of the tiltable drawer and vertically arranged terminal strips avoids the problems inherent in trying to attach a plurality of wires to closely spaced, densely packed terminal strips.

Figure 2:
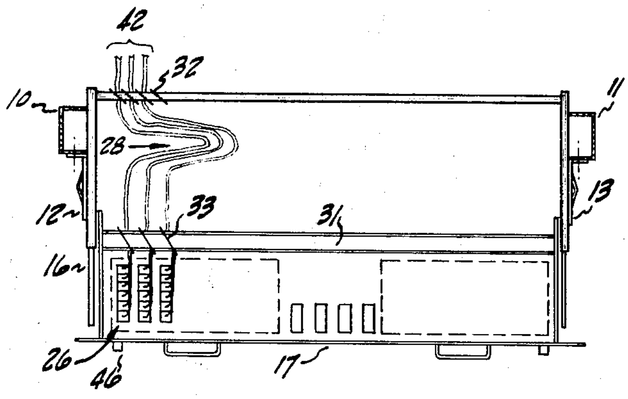
FIG. 2 is a top plan view of the drawer mounted terminal strip in a retracted position which is especially useful for showing the slack in the wire.

When the connections are made to these terminal strips, a slack is left in the wires, as at 28, FIG. 2. This slack is adequate and the wires are sufficiently flexible to allow the drawer to be moved between the retracted and the extended positions 20, 21, respectively (FIG. 3). The slack condition is maintained by lashing the wires to cross-braces 30, 31 on the rack side rails 10, 11 and the back of drawer 17 respectively. The lashing is seen at 32, 33.

Figure 4A:
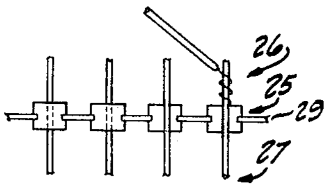
Figure 4B:
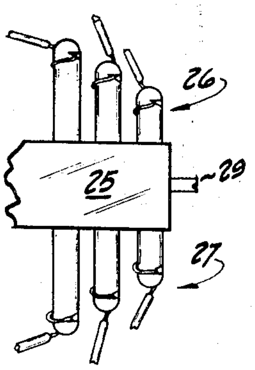

When the drawer 17 is pulled from the rack to its extended position 21, it may be tipped (as at 40) up or down (as at 41) to expose either the bottom or the top of the terminal strip of FIG. 4. The drawer tips at an angle which is adequate for giving a workman room enough for the insertion of either a wire wrap tool or a soldering iron, as required by the nature of the terminal actually used.

The flexibility of the lead-in wires 42 tends to limit the number of such wires which can be lashed between the cross braces 30, 31 and still allow the drawer to move. The problem can be alleviated somewhat by a selection of the correct type of wiring. It can also be alleviated by mounting some other of the non-miniaturizable components in the drawer 17 with the terminal strip, as shown at 44. The particular equipment shown in this drawing had fuses mounted at this point. However, lamps, jacks, and the like, may also be mounted here. A particular advantage of this arrangement is that these components are located at a spot in the housing where they may be associated with other equipment by jumper wires running from a terminal to the fuses.

Any suitable clips, catches and handles may be provided as at 45, 46, 47 to facilitate locking the drawer in one position or another.

While the principles of the invention have been described above in connection with specific apparatus and applications, it is to be understood that this description is made only by way of example and not as a limitation on the scope of the invention.

We claim:

1. A high density rack mounted equipment comprising a terminal strip mounted in a drawer attached to the vertical side rails of said rack, said terminal strip being horizontally positioned in said drawer with connector elements extending vertically, the upper ends of said connector elements being exposed at the top of said drawer and the lower ends of said connector elements being exposed at the bottom of said drawer, a pair of drawer slides mounted on said vertical side rails, said drawer being attached to said slides to move between extended and retracted positions and means for tipping said drawer up when in an extended position to expose the lower ends of said connector elements to facilitate connecting wires thereto and means for tipping said drawer down when in an extended position to expose the upper ends of said connector elements to facilitate connecting wires thereto.

2. The equipment of claim 1 and means for securing said wires to said rack and said drawer when in an extended position whereby slack forms in said wires when said drawer is moved to said retracted position.

3. The equipment of claim 1 and means for inserting fusing in said wires, said fusing being mounted in said drawers adjacent said terminal strip.

References Cited

UNITED STATES PATENTS

| | | | |
|---|---|---|---|
| 2,749,200 | 6/1956 | Kuss | 312—323 |
| 2,857,558 | 10/1958 | Fiske | 317—101 |
| 2,869,958 | 1/1959 | Hough | 312—303 X |
| 3,061,252 | 10/1962 | Berry | 248—54 |
| 3,088,054 | 4/1963 | Meyer | 317—120 |
| 3,138,655 | 6/1964 | Navarro et al. | 174—69 |
| 3,146,048 | 8/1964 | Graham et al. | 312—323 |
| 3,148,007 | 9/1964 | Bertrand | 312—323 |
| 3,253,083 | 5/1966 | Timbers | 312—273 X |

CASMIR A. NUNBERG, *Primary Examiner.*